(12) United States Patent
Benger

(10) Patent No.: US 6,604,873 B1
(45) Date of Patent: Aug. 12, 2003

(54) METHOD FOR CREATING A WORK OF FINE ART THAT IS A COMPOSITE OF TWO WORKS OF FINE ART

(76) Inventor: Brent Benger, 5335 E. Shea Blvd. #2050, Scottsdale, AZ (US) 85250

( * ) Notice: Subject to any disclaimer, the term of this patent is extended or adjusted under 35 U.S.C. 154(b) by 0 days.

(21) Appl. No.: 09/649,941

(22) Filed: Aug. 29, 2000

(51) Int. Cl.⁷ .................................................. B41J 3/42
(52) U.S. Cl. ........................... 400/70; 400/61; 400/76; 358/1.18
(58) Field of Search ............................. 400/70, 76, 61; 358/1.18

(56) References Cited

U.S. PATENT DOCUMENTS

| | | | | |
|---|---|---|---|---|
| 5,109,281 A | * | 4/1992 | Kobori et al. | 358/296 |
| 5,307,452 A | * | 4/1994 | Hahn et al. | 345/592 |
| 5,411,557 A | * | 5/1995 | Terada | 8/444 |
| 5,459,819 A | * | 10/1995 | Watkins et al. | 345/634 |
| 5,508,084 A | * | 4/1996 | Reeves et al. | 428/141 |
| 5,815,645 A | * | 9/1998 | Fredlund et al. | 358/1.18 |
| 5,867,282 A | * | 2/1999 | Fredlund et al. | 358/444 |
| 5,963,214 A | * | 10/1999 | Cok et al. | 345/630 |
| 5,986,671 A | * | 11/1999 | Fredlund et al. | 345/629 |
| 6,295,370 B1 | * | 9/2001 | D'Hooge | 382/162 |
| 2002/0118209 A1 | * | 8/2002 | Hylen | 345/582 |
| 2002/0118891 A1 | * | 8/2002 | Rudd et al. | 382/282 |

FOREIGN PATENT DOCUMENTS

| | | | | |
|---|---|---|---|---|
| CN | 1305903 A | * | 8/2001 | B44C/3/08 |
| JP | 11052501 A | * | 2/1999 | G03B/35/00 |

* cited by examiner

Primary Examiner—Charles H. Nolan, Jr.
(74) Attorney, Agent, or Firm—Jeffrey Weiss; Harry M. Weiss; Weiss, Moy & Harris, P.C.

(57) ABSTRACT

A method for creating a composite work of fine art, that is the combination of two works of fine art. Generally, the first work of fine art will provide the setting and will include a figure (e.g., a person,, an animal, or an inanimate object) to correspond to all or a portion of a figure in the second work. After the first and second works are created as works of fine art, typically hand-created paintings, they are digitized and imported into image editing software. There, the works are conformed and the second image is pasted into the first. The final product is then printed as a work of fine art; as a lithograph, print, or as having the appearance of a hand-created painting.

15 Claims, 3 Drawing Sheets

METHOD FOR CREATING A WORK OF FINE ART THAT IS A COMPOSITE OF TWO WORKS OF FINE ART

FIELD OF THE INVENTION

This invention relates generally to the creation of works of art and, more specifically, to a method for creating a work of fine art having the appearance of a single original work of art but that is in fact a composite of two works of art created separately.

BACKGROUND OF THE INVENTION

Works of fine art, including specifically paintings, lithographs, prints, and other print-type works having the appearance of an original or limited edition product, are extremely desirable. They can also be very expensive, depending on the complexity of the work, the artist, and other factors.

Generally, a person who wishes to, for example, commission a professional artist to create an original portrait of a friend or family member can expect to pay a significant fee. The amount of that fee will depend in part on the complexity of the work commissioned. Thus, to the extent that the work includes a particularly complicated scene, the price will be higher. The cost can be prohibitive for most.

Related to the issue of cost is that of time. A complicated work of art can be time consuming for even a professional artist to create. If the piece is to be individualized for a particular customer and is to be a work of fine art, generally only one original will be created. While an original work can be copied as fine art prints using lithographic, giclee or other techniques, such copying does not permit the alteration of the original work in a manner to suit individual customers.

A need therefore existed for a method that would permit the creation of a fine work of art that is at the same time relatively easily produced in multiple fine art copies but wherein the image is also customizable to suit individual needs.

SUMMARY OF THE INVENTION

An object of the present invention is to provide a method for creating a work of fine art that is a composite of two separate works of fine art, wherein one of the works is generic and the other unique.

BRIEF DESCRIPTION OF THE PREFERRED EMBODIMENTS

In accordance with one embodiment of the present invention, a method for creating a composite work of fine art is disclosed. The method comprises the steps of: creating a first work of fine art; digitizing the first work of fine art; importing the digitized first work of fine art into an image editing computer software program; creating a second work of fine art; digitizing the second work of fine art; importing the digitized second work of fine art into an image editing computer software program; using the image editing computer software program to conform the digitized first work of fine art to the digitized second work of fine art; using the image editing computer software program to paste the conformed digitized second work of fine art into the digitized first work of fine art to create a third work of fine art; outputting the third work of fine art to a fine art printing device; and printing the third work of fine art on the fine art printing device.

In accordance with another embodiment of the present invention, a method for creating a composite work of fine art is disclosed. The method comprises the steps of: creating a first work of fine art having a permanent portion and a replaceable portion; creating a first set of four lithographic plates representing the permanent portion of the first work of fine art; creating a second work of fine art to replace the replaceable portion in the first work of fine art; creating a second set of four lithographic plates representing the second work of fine art; providing an offset lithography printing press; inserting the first set and the second set of lithographic plates into the offset lithography printing press; and printing the first set and the second set of lithographic plates onto a printing surface.

In accordance with still another embodiment of the present invention, a method for creating a composite work of fine art is disclosed. The method comprises the steps of: creating a first work of fine art having a permanent portion and a replaceable portion; digitizing the first work of fine art; creating a second work of fine art to replace the replaceable portion in the first work of fine art; digitizing the second work of fine art; creating a film version combining the permanent portion of the first work of fine art and the second work of fine art; creating a set of four lithographic plates from the film version; providing an offset lithography printing press; inserting the set of four lithographic plates into the offset lithography printing press; and printing the set of four lithographic plates onto a printing surface.

The foregoing and other objects, features, and advantages of the invention will be apparent from the following, more particular description of the preferred embodiments of the invention, as illustrated in the accompanying drawings.

DETAILED DESCRIPTION OF THE PREFERRED EMBODIMENTS

The present invention is directed to a method for creating a fine art work that is a composite of two separate works. The term "fine art work" or "fine work of art" is meant to refer to visual works having the appearance of an original painting, a lithograph, or limited edition print. The term is meant to distinguish works having the appearance of a photograph or photocopy. In essence, the present invention is directed to a method for editing paintings, as opposed to photographic images.

Figure 1:
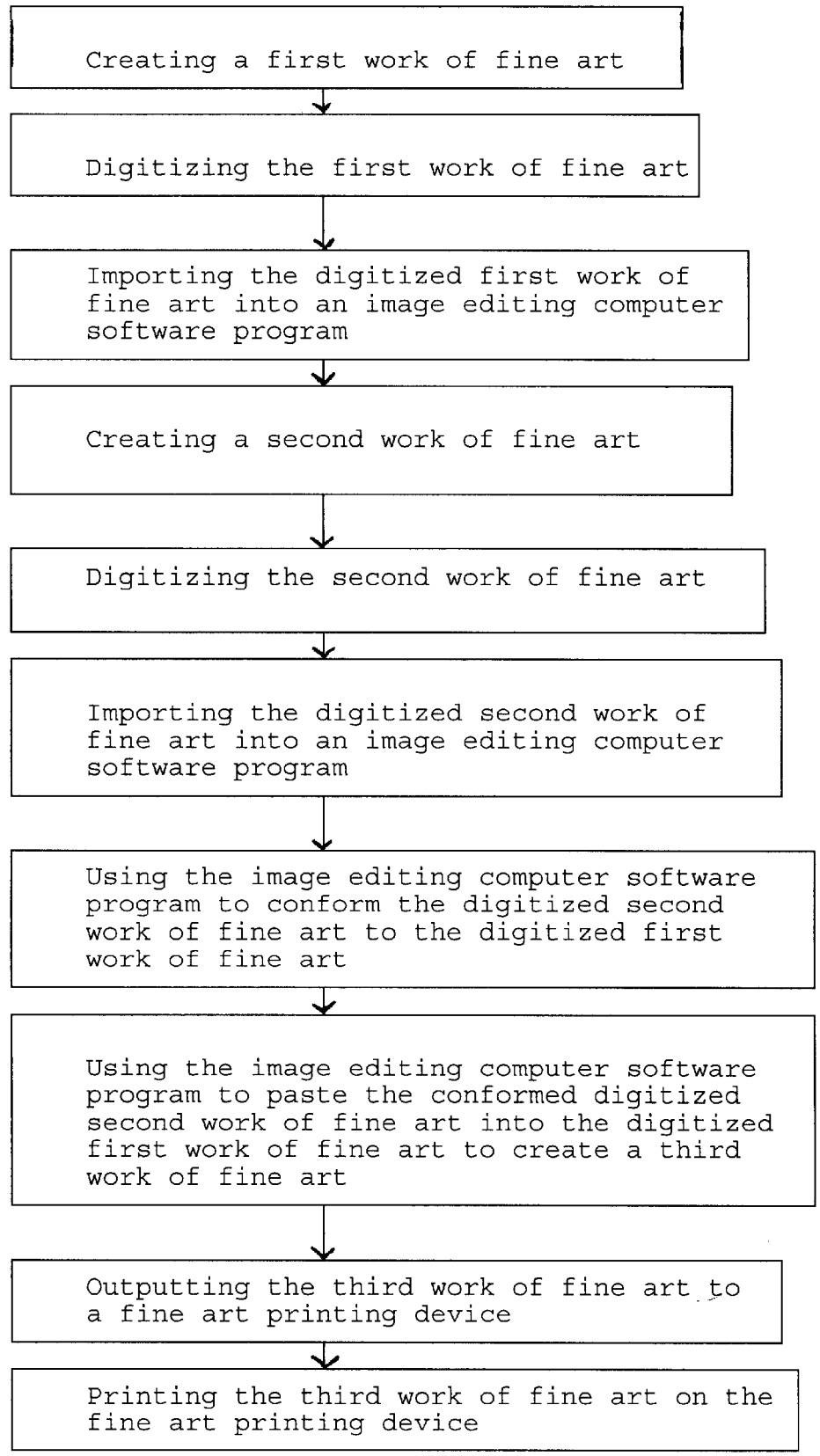
FIG. 1 is a flow chart of an embodiment of the method of the present invention.
Figure 2:
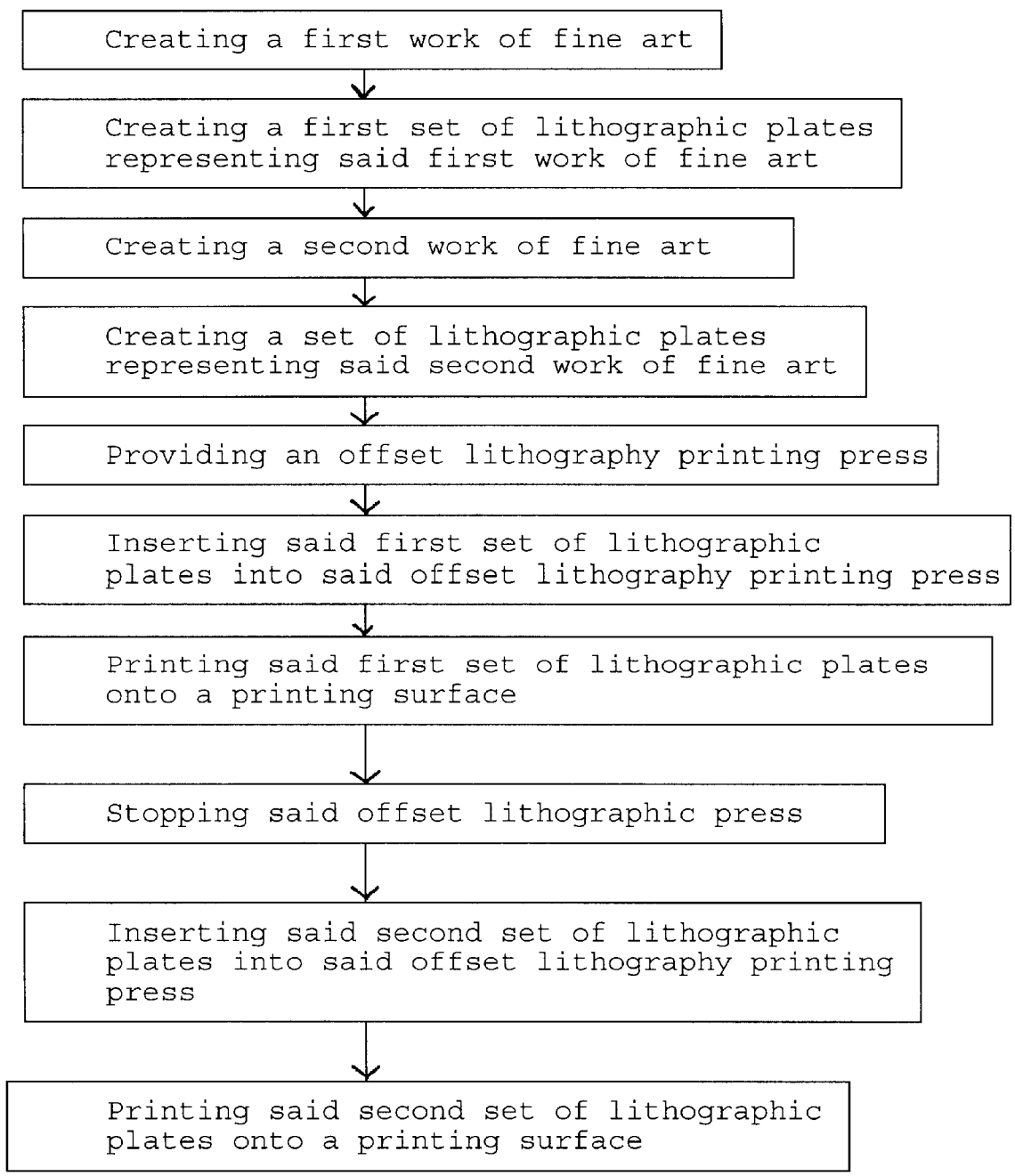
FIG. 2 is a flow chart of another embodiment of the method of the present invention.
Figure 3:
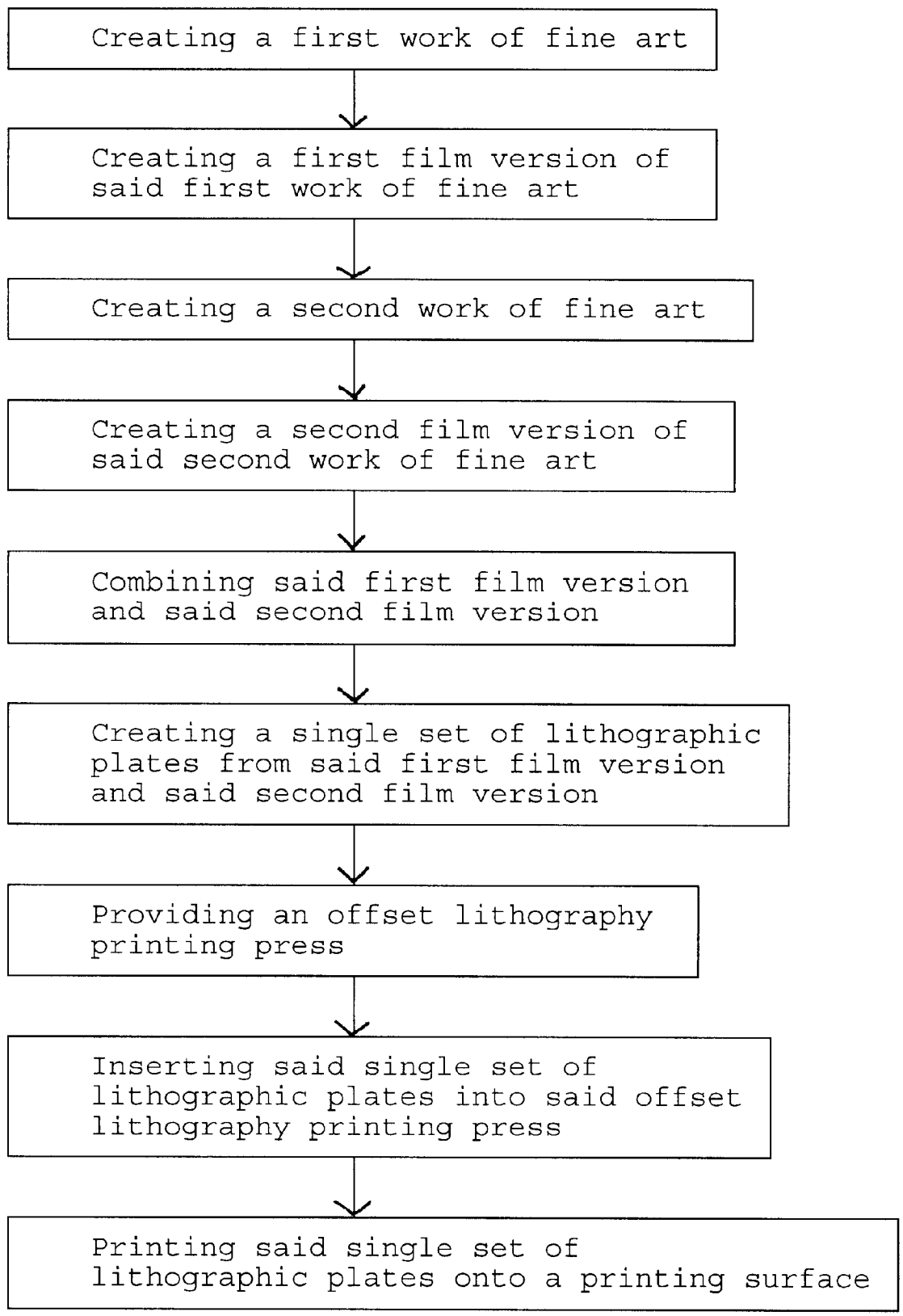
FIG. 3 is a flow chart of yet another embodiment of the method of the present invention.

As indicated in the flow chart in FIG. 1, the method begins with the creation of a first work of fine art. The first work of fine art is, preferably, the template or generic portion of the work, into which a second work of fine art will be integrated. Preferably, the first work of fine art includes a background scene of some type—for example a courtroom setting, a baseball game, etc.—and further includes a replaceable portion preferably comprising one or more persons, pets, inanimate (e.g., a sign on a building, initials on a briefcase, etc.) or other object(s) to he replaced. The first work of fine art will preferably be created as an original, hand-created painting.

The next step in the method is to digitize the first work of fine art so that it may be inputted into a computer and manipulated using computer software. There are a number of different methods available for digitizing a painting. These include photographing the painting with a digital camera, scanning the painting with a computer scanner, and creating a transparency of the painting and then scanning the transparency with a computer scanner.

Once a digital image has been created of the first work, it is imported into an image editing computer software program. Programs currently on the market that would be suitable include PC Pro®, Adobe Photo Shop®, and Painter®. Other image editing software may be utilized or specially created to manipulate the computer images described herein.

Generally, the next step in the method will be the creation of a second work of fine art. The second work of fine art is, preferably, the insert portion of the finished work, which will be integrated into the first work of fine art to replace the replaceable portion of that work. Thus, if the replaceable portion of the first work is a person, the second work will depict a person; if the replaceable portion is a pet, the second work will depict a pet; etc. All or more typically a portion (e.g., the face) of the subject of the second work of art will replace the corresponding replaceable image in the first work of art. Like the first work of fine art, the second work of fine art will preferably be created as an original, hand-created painting. That painting may be created from a live subject or, if more convenient, may be painted from a photograph or other depiction of the subject. (An advantage of the use of a photograph would be that the second work of fine art could be created without the need for bringing the subject of that work before the artist, something that may not be possible for a variety of reasons—e.g., the subject is deceased, the creation of the work is a surprise to the subject, the subject and artist are remote from one another, etc.) Optionally, a photograph of the subject of the second work may itself be digitized and manipulated so as to have the appearance of a work of fine art—so that the photograph replaces the second work of fine art and eliminates the step of creating by hand the second work of fine art. It may also be possible to create the second work as an original work using computer illustration software, manipulated to have the appearance of a fine work of art.

Once the second work of fine art is created, it too needs to be digitized so that it may ultimately be combined with the first work of fine art. Any appropriate method can be used to accomplish this step, including any of the particular examples provided above. Once digitized, the image of the second work of art is imported into the image editing computer software program.

As part of the process of combining the second and first works, it is necessary to conform those works with respect to size and color. Preferably, the first work of fine art will be considered the standard, to which the second work must be adjusted with respect to size and color in advance of integration. It would be possible, however, to adjust the size and color of the first work to correspond with that of the second—as desired for aesthetic or other reasons.

Once the first and second works of art are digitized and conformed with respect to size and color, they are ready to be combined. In essence, that portion of the second work of art that is to appear in the final product is pasted and edited into the first work of fine art. (If a software program is utilized that uses a layering process, such as Adobe Photo Shop®, such pasting and editing will preferably incorporate this function. Accordingly, the term "paste" as used herein is meant to refer to the necessary steps, including pasting, editing, sizing, color-conforming, layering, layer insertion, and other necessary or appropriate functions involved in placing the second work of art into the first.) Optionally, blue screen/green screen/grey screen technology may be used to facilitate the pasting in of the second work into the first.

If for example the first work of art is a courtroom setting showing a lawyer presenting a case a face depicted in the second work of art can be pasted into the first work, replacing the face in the first work. This combined image is now a new, third work of art ready to be printed.

Once the work of combination is complete, the combined image is outputted to a printing device capable of producing a work having the appearance of a painting or other fine work of art. Printing devices considered suitable include lithographic printing presses, die sublimation printers, digital presses, ink jet printers capable of producing a single fine art work at a time (such as the Epson®, Iris®, Roland® ink jet printer), or photographic duplication equipment permitting the printing of a fine art work on photographic paper. The resulting product will have the appearance of a custom-made fine work of art. But, from the point of view of the artist, he or she has not had to re-create perhaps the majority of the image in the combined work—e.g., the courtroom setting, the ball field, etc. And, from the point of view of the customer, he or she has not incurred the full cost of the artist's labor in creating that portion of the image. There should also be a significant savings in time.

It is generally assumed that the combined work will be printed onto a canvas-type or paper medium—ultimately to be framed and displayed as a fine work of art having the look and feel of an original painting or limited edition lithograph or print. It would also be possible, however, to print the combined work onto a shirt, mug, mousepad or other surface—as long as the look and feel of a fine work of art is maintained.

While the invention has been particularly shown and described with reference to preferred embodiments thereof, it will be understood by those skilled in the art that the foregoing and other changes in form and details may be made therein without departing from the spirit and scope of the invention. For example, while both the first and second works will preferably be hand-painted by an artist—from a live subject, from a real setting, or from a photograph—it would be possible to create one or both works using computer software. In this embodiment, the use of a fine art printing device such as one of those listed above will still provide the composite work with the look and feel of a single, fine art work of art.

As a further example, the order of the different method steps can also be varied. For example, while it would be possible to create the first work, digitize, and import it into an image editing software program before the second work is created, it would be possible to create the second work at any stage of the process—including even before the first work is created.

In another embodiment, two original fine art works can be combined in a single composite work in a manner that avoids entirely the need for digitizing and the use of image editing computer software. For example, and particularly where a large number of people are the subject of the second work that is to be inserted into the first work, the relatively more cumbersome process of traditional offset lithography could be utilized in a novel manner. Generally, offset lithography involves the creation of a set of four lithographic plates from a film version of the work of art, which plates are then placed in a lithographic press to generate fine works of art. (Because an image is created using four colors—each represented on a single lithographic plate—four plates are necessary in a lithographic process.) However, it would be possible to create a set of four plates representing the permanent portion of the first work, four plates representing the replaceable portion of the first work, and four plates representing the replacement portion of the second work. To print the first work, the eight plates representing the two portions of that work would be loaded onto a lithographic press capable of accepting eight plates, and printed. To print the third, composite work, the four plates representing the replacement portion of the second work would be inserted into the press, taking the place of the four plates representing the replacement portion of the first work, which plates would be removed.

In another embodiment, offset lithography may be utilized in a manner not requiring an eight plate machine. In this embodiment, the portion of the first work that is to remain following insertion is digitized in order to be placed into film form, from which a set of lithographic plates can be made. The portion of the second work to be inserted is then also digitized for this purpose. Then, using appropriate software, the digitized images are combined and a single set of films is created containing a combination of the two images and a single set of four lithographic plates is created combining both works—which plates may then be used to print on a lithograph press the combined work. As an alternative to the computerized process, the film for the creation of the lithographic plates can come from direct camera separations of the work of fine art, which separations can then be hand-stripped together.

I claim:

1. A method for creating a composite work of fine art comprising the steps of:

hand-painting a first work of fine art; digitizing said first work of fine art;

importing said digitized first work of fine art into an image editing computer software program;

hand-painting a second work of fine art;

digitizing said second work of fine art;

importing said digitized second work of fine art into an image editing computer software program;

using said image editing computer software program to conform said digitized second work of fine art to said digitized first work of fine art;

using said image editing computer software program to paste said conformed digitized second work of fine art into said digitized first work of fine art to create a third work of fine art having the appearance of a single, hand-painted work of art;

outputting said third work of fine art to a fine art printing device; and printing said third work of fine art on said fine art printing device.

2. The method of claim 1 wherein said step of digitizing said first work of fine art comprises the step of photographing said first work of fine art with a digital camera.

3. The method of claim 1 wherein said step of digitizing said first work of fine art comprises the step of scanning said first work of fine art with a scanner.

4. The method of claim 1 wherein said step of digitizing said first work of fine art comprises the steps of creating a transparency of said first work of fine art and scanning said transparency with a scanner.

5. The method of claim 1 or 2 wherein said step of digitizing said second work of fine art comprises the step of photographing said second work of fine art with a digital camera.

6. The method of claim 1 or 3 wherein said step of digitizing said second work of fine art comprises the step of scanning said second work of fine art with a scanner.

7. The method of claim 1 or 4 wherein said step of digitizing said second work of fine art comprises the steps of creating a transparency of said second work of fine art and scanning said transparency with a scanner.

8. The method of claim 1 wherein said fine art printing device is a lithographic printing press.

9. The method of claim 1 wherein said fine art printing device is one of an Epson®, Iris® and a Roland® ink jet printer.

10. The method of claim 1 further comprising the step of printing said third work of fine art onto a canvas.

11. The method of claim 1 further comprising the step of printing said third work of fine art onto a mug.

12. The method of claim 1 further comprising the step of printing said third work of fine art onto a shirt.

13. The method of claim 1 further comprising the step of printing said third work of fine art onto a mousepad.

14. The method of claim 1 further comprising the step of printing said third work of fine art onto paper.

15. The method of claim 1 wherein the first work of fine art includes a portrait of a background scene into which at least one person may be inserted and the second work of fine art includes a portrait of at least a portion of a person and wherein said at least a portion of a person is adapted to be inserted into said background scene.

* * * * *